United States Patent [19]

Comerford

[11] Patent Number: 5,000,526
[45] Date of Patent: Mar. 19, 1991

[54] VIDEO CASSETTE HOLDER APPARATUS

[76] Inventor: Declan L. Comerford, 65 Loreto Ave., Rathfarnham, Dublin 14, Ireland

[21] Appl. No.: 519,794

[22] Filed: May 7, 1990

[51] Int. Cl.⁵ .............................................. A47B 81/06
[52] U.S. Cl. ...................................... 312/15; 206/387; 211/40; 211/41
[58] Field of Search .................... 206/309, 387; 312/9, 312/10, 11, 12, 13, 15, 18, 19, 319; 211/40, 41

[56] References Cited

U.S. PATENT DOCUMENTS

| | | | |
|---|---|---|---|
| 2,475,495 | 7/1949 | Haag | 312/15 |
| 3,391,792 | 7/1968 | Makar | 312/13 |
| 3,811,745 | 5/1974 | Cylke | 312/13 |
| 4,087,138 | 5/1978 | McRae | 206/387 |
| 4,121,877 | 10/1978 | Brown | 206/387 |
| 4,235,490 | 11/1980 | Schwartz et al. | 312/15 |
| 4,270,817 | 6/1981 | McRae | 312/15 |
| 4,330,161 | 5/1982 | Khawand | 206/387 |
| 4,330,162 | 5/1982 | Aboussouan | 312/15 |
| 4,339,162 | 7/1982 | Gelardi et al. | 312/10 |
| 4,519,655 | 5/1985 | Kamperman | 312/12 |
| 4,549,775 | 10/1985 | Carter | 312/15 |
| 4,647,118 | 3/1987 | Kamperman | 312/13 |
| 4,668,027 | 5/1987 | King et al. | 312/13 |

FOREIGN PATENT DOCUMENTS

| | | | |
|---|---|---|---|
| 620996 | 5/1927 | France | 312/15 |
| 266831 | 3/1927 | United Kingdom | 312/13 |

Primary Examiner—David T. Fidei
Attorney, Agent, or Firm—Leon Gilden

[57] ABSTRACT

An apparatus is set forth wherein a housing includes a forward wall spaced rearwardly of and parallel to a rear wall, wherein the forward wall is of a lesser height than that of the rear wall, with a floor extending rearwardly of the forward wall spaced from the rear wall, with a first inclined wall extending upwardly and rearwardly of the floor spaced below and parallel to a second inclined wall extending above and rearwardly of the first inclined wall, wherein the first and second inclined walls are arrranged at an obtuse angle relative to the floor. The housing includes a series of spaced cylinders defining cassette cradles therebetween to accept pivot cylinders mounted to a floor of an associated cassette holder, wherein the cassette holders are removably and pivotally mounted relative to the housing and are pivotally arranged thereto by the pivot cylinders received within the cradles. Rotation of the cassette holders relative to the cylinder is limited by an abutment flange mounted orthogonally to a top terminal edge of the forward wall.

4 Claims, 4 Drawing Sheets

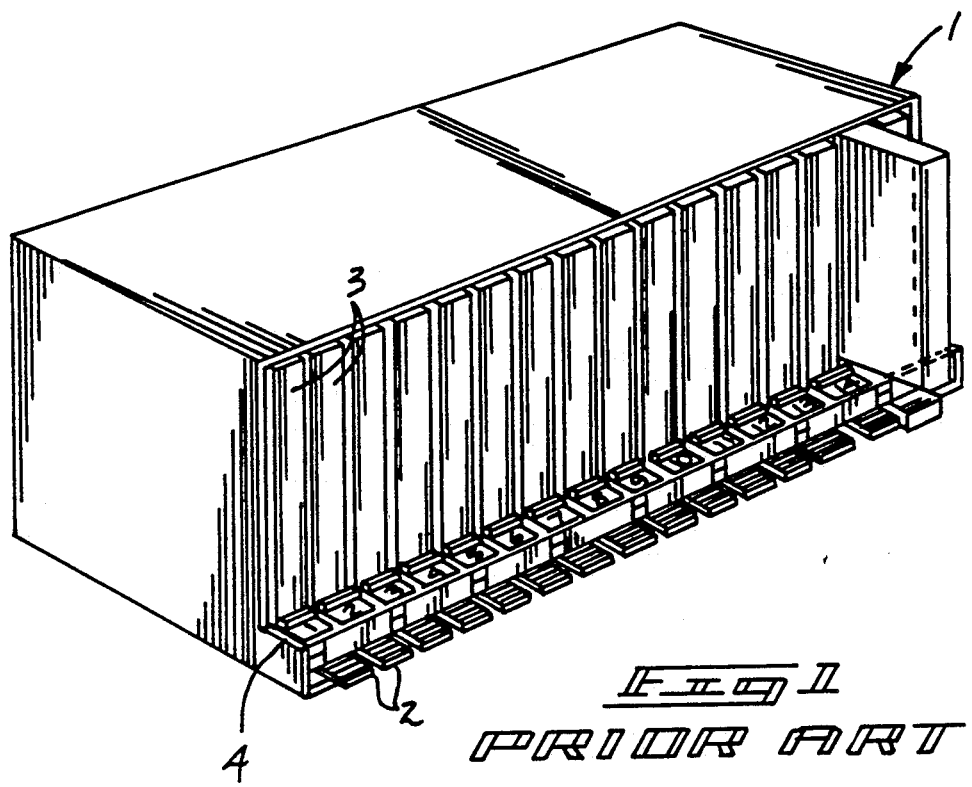
Fig 1
PRIOR ART
Fig 2
PRIOR ART
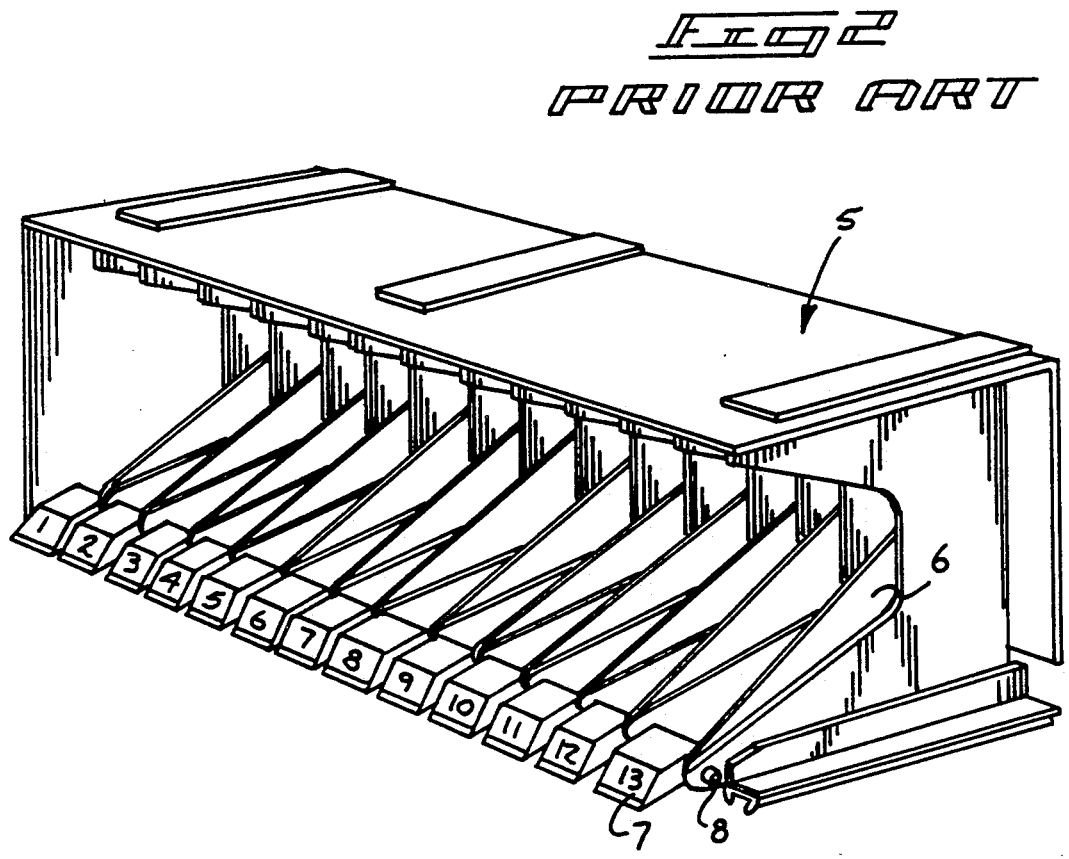

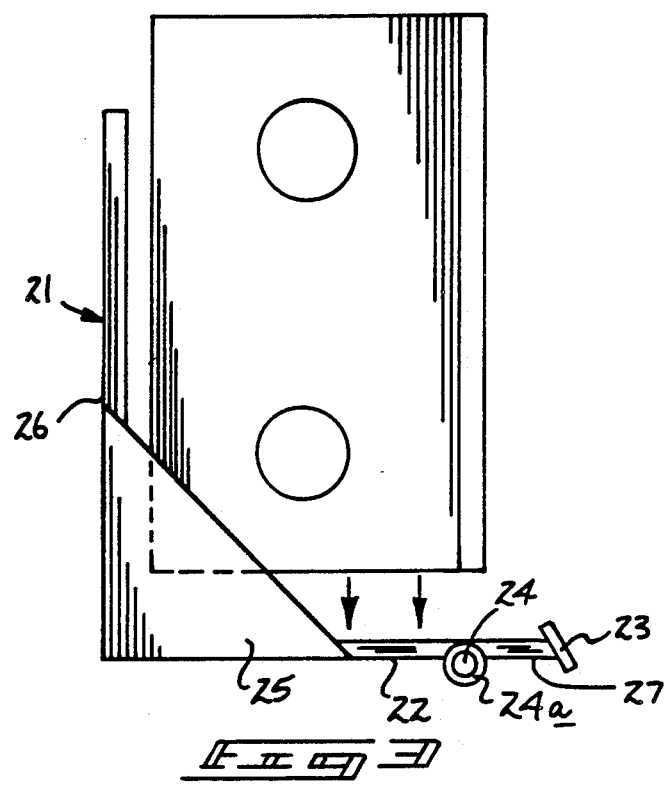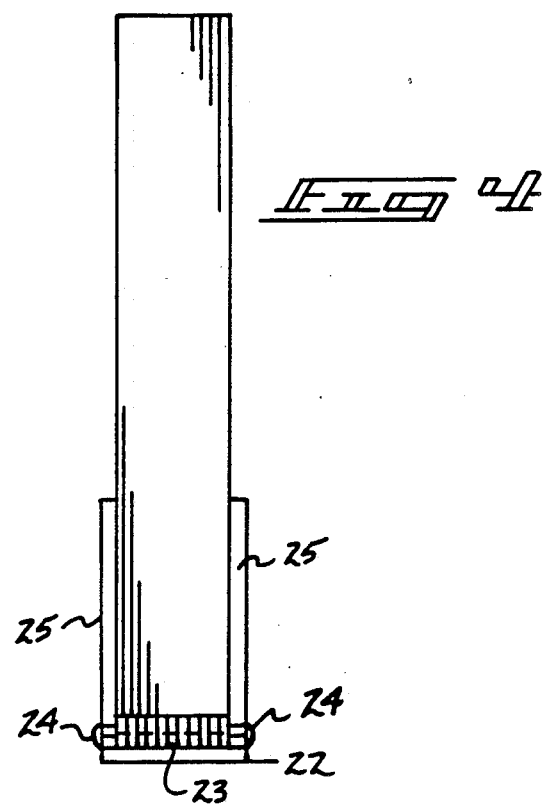

VIDEO CASSETTE HOLDER APPARATUS

BACKGROUND OF THE INVENTION

1. Field of the Invention

The field of invention relates to cassette holder apparatus, and more particularly pertains to a new and improved video cassette holder apparatus wherein the same permits ease of removal of a holder relative to an associated housing structure to contain a cassette within each cassette holder.

2. Description of the Prior Art

Cassette holders of various types have been utilized in the prior art to provide access of cassettes to an individual. Typically, parallel slots arranged within a housing are provided for such storage. The instant invention attempts to overcome deficiencies of the prior art by providing ease of access and positioning of a single cassette relative to an aligned array of cassettes for ease of removal of the cassette and the holder relative to a storage housing. Examples of prior art cassette holders include U.S. Pat. No. 4,772,077 to Beam, et al. wherein cartridges are secured within a housing within individual support members, and wherein the support members are pivotally mounted within the housing but are not removable therefrom, wherein access to the individual cartridges rely on ejection of a cartridge from an associated holder.

U.S. Pat. No. 4,270,817 to McRae sets forth a storage and dispensing cabinet wherein individual cassettes mounted interiorly of the housing are biased outwardly thereof and are subsequently ejected upon depressing of a forwardly positioned flange associated with each cartridge.

U.S. Pat. N. 4,779,730 to Hartsfield, et al, sets forth a storage container for storage of media members therewithin defining slots arranged in a parallel relationship relative to a container.

U.S. Pat. No. 4,577,914 to Stravitz sets forth a series of slots also arranged within a housing for reception of various cartridges therewithin.

U.S. Pat. No. 4,819,802 to Gutierrez sets forth a cassette holder rack wherein the rack is defined by open side walls to permit access to slotted support members within the holder, wherein each of the cartridges are typically biased exteriorly of the holder for access by an individual.

As such, it may be appreciated that there continues to be a need for a new and improved video cassette holder apparatus wherein the same addresses both the problems of ease of use as well as effectiveness in construction in permitting access to various cassettes mounted within the holder and in this respect, the present invention substantially fulfills this need.

SUMMARY OF THE INVENTION

In view of the foregoing disadvantages inherent in the known types of cassette holder apparatus now present in the prior art, the present invention provides a video cassette holder apparatus wherein the same provides pivotment of individual cassette holders mounting an individual cassette therewithin to provide ease of access of individual cassettes by an individual to the various cassette members contained within the apparatus. As such, the general purpose of the present invention, which will be described subsequently in greater detail, is to provide a new and improved video cassette holder apparatus which has all the advantages of the prior art cassette holder apparatus and none of the disadvantages.

To attain this, the present invention provides an apparatus setting forth a housing including a forward wall spaced rearwardly of and parallel to a rear wall, wherein the forward wall is of a lesser height than that of the rear wall, with a floor extending rearwardly of the forward wall spaced from the rear wall, with a first inclined wall extending upwardly and rearwardly of the floor spaced below and parallel to a second inclined wall extending above and rearwardly of the first inclined wall, wherein the first and second inclined walls are arranged at an obtuse angle relative to the floor. The housing includes a series of spaced cylinders defining cassette cradles therebetween to accept pivot cylinders mounted to a floor of an associated cassette holder, wherein the cassette holders are removable and pivotally mounted relative to the housing and are pivotally arranged thereto by the pivot cylinders received within the cradles. Rotation of the cassette holders relative to the cylinder is limited by an abutment flange mounted orthogonally to a top terminal edge of the forward wall.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved video cassette holder apparatus which has all the advantages of the prior art cassette holder apparatus and none of the disadvantages.

It is another object of the present invention to provide a new and improved video cassette holder apparatus which may be easily and efficiently manufactured and marketed.

It is a further object of the present invention to provide a new and improved video cassette holder apparatus which is of a durable and reliable construction.

An even further object of the present invention is to provide a new and improved video cassette holder apparatus which is susceptible of a low cost of manufacture with regard to both materials and labor, and which accordingly is then susceptible of low prices of sale to the consuming public, thereby making such video cassette holder apparatus economically available to the buying public.

Still yet another abject of the present invention is to provide a new and improved video cassette holder apparatus which provides in the apparatus and methods of the prior art some of the advantages thereof, while simultaneously overcoming some of the disadvantages normally associated therewith.

Still another object of the present invention is to provide a new and improved video cassette holder apparatus wherein the same includes individual video cassette holder containers selectively mounted within a housing arranged at an inclined angle relative to the housing, and further permitting pivotment of the individual holders for ease of access by an individual.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

FIG. 1 is an isometric illustration of a prior art video cassette holder.

FIG. 2 is an isometric illustration of a further prior art video cassette holder.

FIG. 3 is an orthographic side view, taken in elevation, of an individual cassette holder utilizer by the instant invention.

FIG. 4 is an orthographic front view, taken in elevation, of the holder, as illustrated in FIG. 3.

DESCRIPTION OF THE PREFERRED EMBODIMENT

Figure 5:
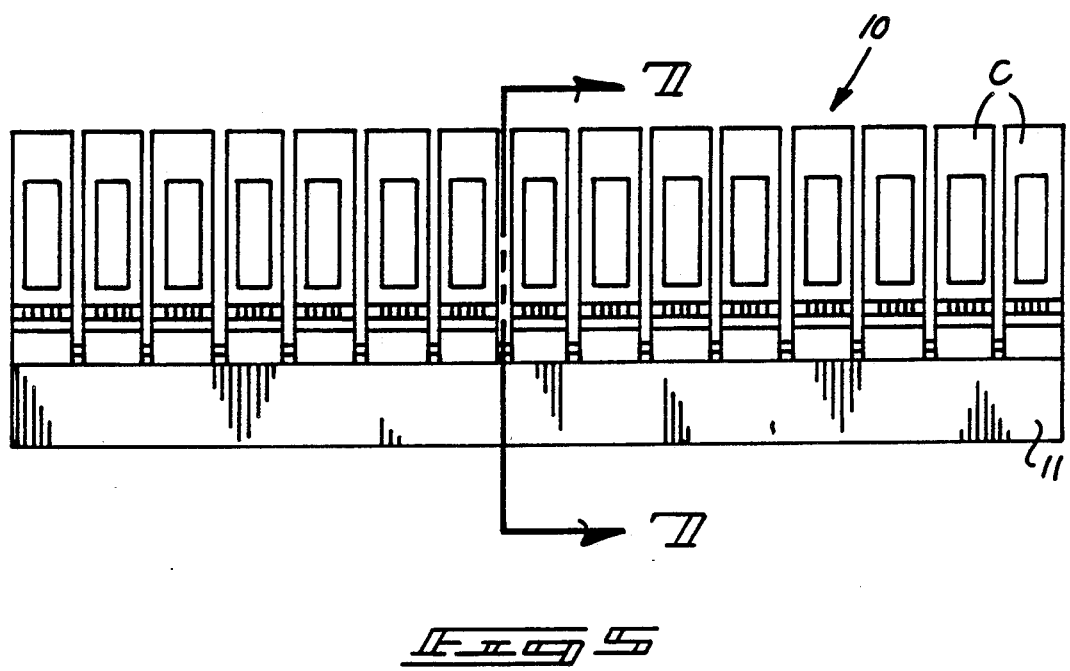
FIG. 5 is an orthographic front view, taken in elevation, of the instant invention.

With reference now to the drawings, and in particular to FIGS. 1 to 8 thereof, a new and improved video cassette holder apparatus embodying the principles and concepts of the present invention and generally designated by the reference numeral 10 will be described.

FIG. 1 illustrates a prior art cassette holder apparatus 1 utilizing a series of aligned tabs 2 that permit directing of a cassette 3 mounted within housing to be ejected forwardly upon depressing of the tabs and lowering an abutment 4 associated with each cassette. FIG. 2 illustrates a further prior art cassette holder 5, wherein the tabs 7 permit pivotment of an individual cassette holder 6 interiorly of the housing about an elongate axle 8.

Figure 6:
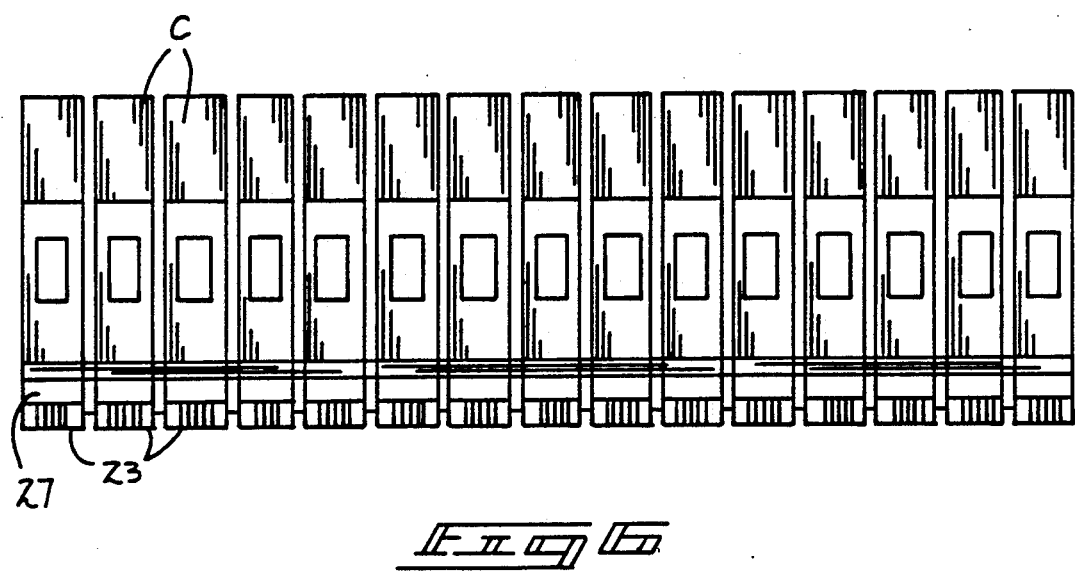
FIG. 6 is an orthographic top view of the instant invention.
Figure 7:
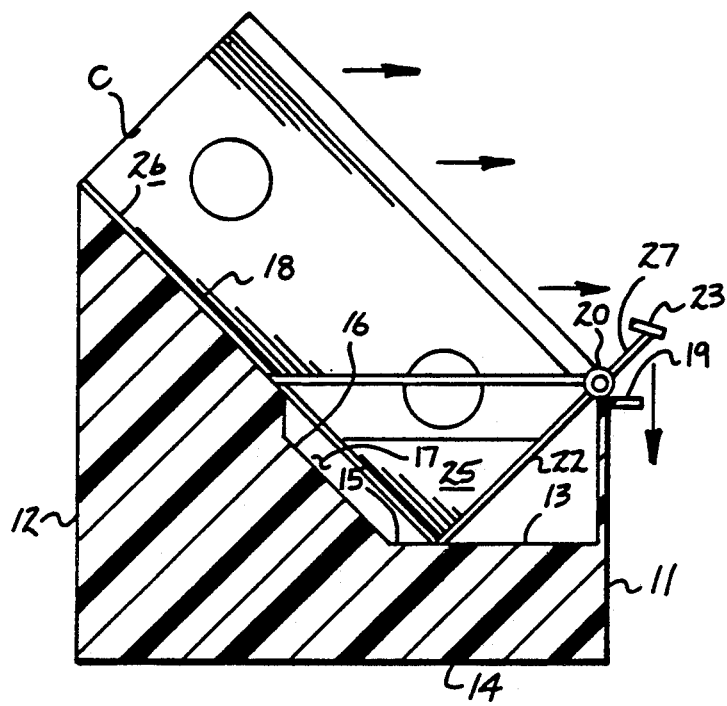
FIG. 7 is an orthographic side view of the instant invention taken along the lines 7—7 of FIG. 5 in the direction indicated by the arrows.
Figure 8:
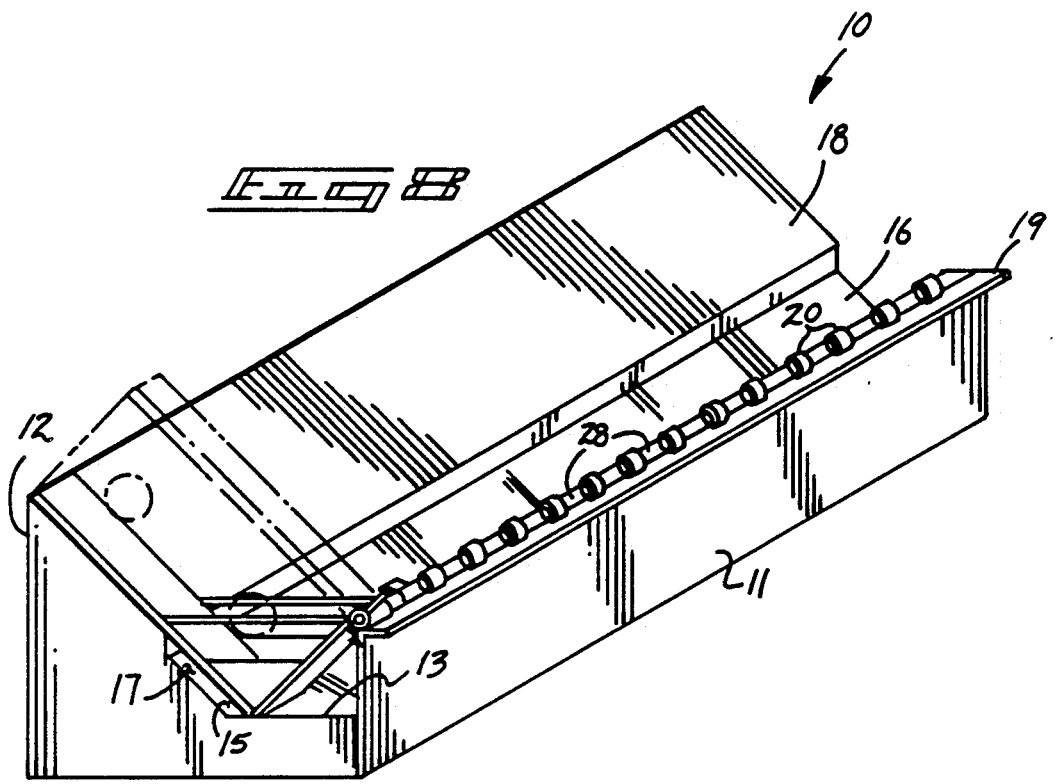
FIG. 8 is an isometric illustration of the instant invention.

More specifically, the video cassette holder apparatus 10 of the instant invention essentially comprises a housing defined by a forward elongate planar vertical wall 11 defined by a first height spaced forwardly of and parallel to a rear vertical wall 12 coextensively arranged relative to the forward wall 11 defined by a second height greater than the first height. It is contemplated that the second height be substantially one and one-half to two times the height of the first wall. An elongate bottom wall 14 is orthogonally arranged and coextensive between the forward and rear vertical walls 11 and 12. An elongate planar floor 13 is spaced parallel to and coextensive with the bottom wall 14 and orthogonally intersects the forward wall 11 a predetermined distance below a top terminal edge of the forward wall. The floor 13 extends rearwardly of the forward wall 11 to define a rear floor edge 15 spaced from the rear vertical wall 12. The rear floor edge 15 defines an intersection with the first inclined wall 16 directed rearwardly of the floor 13 defining an elongate trough 17. A second inclined wall 18 extends above the trough and is parallel to the first inclined wall 16. The first and second inclined walls 16 and 18 are arranged at an obtuse angle relative to the floor 13. An abutment flange 19 is mounted orthogonally to and extending forwardly of and coextensive with the forward wall 11 mounted at the top terminal edge of the forward wall 11, wherein the flange is arranged generally parallel to the floor 13. A series of equally spaced and coaxially aligned cylinders 20 spaced apart a predetermined distance are mounted adjacent the intersection defined by the forward wall 11 and the abutment flange 19. Spaced pairs of the cylinders define an arcuate pivot cylinder cradle 28 therebetween to complementarily receive a cylindrical support 24a mounted to a floor plate 22 of an associated cassette holder 21. The cassette holders 21 are arranged in alignment within the housing, as illustrated in FIGS. 5 and 6 for example.

Each cassette holder 21, as noted, includes an elongate floor plate 22 defined by a predetermined width equal to the predetermined spacing between the aligned cylinders 20, with a pivot cylinder 24a mounted to the floor plate 22 orthogonally arranged thereto, with a plurality of coaxially aligned projections 24 extending through each side and coaxially of the pivot cylinder 24a. The projections are received within spaced cylinders 20. An ejector flange 23a is mounted integrally to a forward end of the floor gate 22 for accepting manual pressure applied thereon for pivotment of the floor plate and associated cassette holder 21 about the spaced pair of cylinders 20. The floor plate 22 extends rearwardly and includes a plurality of side wall flanges 25 extending upwardly and orthogonally relative to the floor plate, with a rear wall 26 mounted to the side wall flanges 25 and extending orthogonally relative to the floor plate 22. The trough 17 (see FIG. 7) provides clearance for pivotment of the rear terminal edge of the floor plate 22 where it intersects the rear wall 26 to permit pivotment of the cassette "C" mounted within the holder 21. A portion of the floor plate 22 defined between the pivot cylinder 24a and the ejector flange 23 is defined as a floor abutment surface 27 to engage an upper surface of the flange 19 upon pivotment of the holder 21 relative to the housing of the apparatus 10. In this manner, manual depression of the ejector flange 23a effects pivotment of the holder 21 about the spaced cylinders 20 to project an associated cassette "C" relative to an aligned series of such cassettes.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A video cassette holder apparatus comprising,
   a housing, the housing including a forward vertical wall defined by a first height, a rear vertical wall spaced from and coextensive with the forward vertical wall arranged parallel thereto defined by a second height, and
   a bottom wall extending between the forward and rear vertical walls, and
   an elongate cavity defined within the housing between the forward and rear vertical walls, the elongate cavity including an elongate cavity arranged above and parallel to the bottom wall, and
   a series of cassette holders removably and pivotally mounted within the elongate cavity in an aligned relationship, and
   hinge means mounted coextensively with a top edge of the forward vertical wall to removably and pivotally mount each cassette holder within the elongate cavity, and
   the second height is substantially greater than the first height, and
   the second height is substantially equal to one and one-half to two times the first height, and
   including an elongate trough arranged rearwardly of the elongate cavity floor, the elongate cavity floor orthogonally intersecting the forward vertical wall below a edge of the forward vertical wall, the top edge of the forward vertical wall arranged generally parallel to the elongate cavity floor, and the trough including a first inclined wall defining a trough floor, and a second inclined wall spaced above and rearwardly of the first inclined wall, wherein the second inclined wall is parallel to the first inclined wall, wherein the first and second inclined walls are arranged at an obtuse angle relative to the elongate cavity floor, and the elongate cavity floor includes a rear floor edge spaced from the rear vertical wall, and the rear floor edge intersecting the first inclined wall.

2. An apparatus as set forth in claim 1 wherein the hinge means includes a series of coaxially aligned cylinders spaced apart a predetermined spacing relative to one another, and a cassette holder mounted between pairs of aligned cylinders within each predetermined spacing, and each cassette holder includes an elongate floor plate defined by a predetermined width equal to the predetermined spacing, the floor plate including an ejector flange integrally mounted to a forward terminal edge of each floor plate, and each floor plate including a pivot cylinder mounted orthogonally relative to each floor plate rearwardly of each ejector flange, and each pivot cylinder including a coaxially aligned projection extending beyond each side of the floor plate, and each of the projections receivable within a respective cylinder, and each floor plate including a rear wall orthogonally and integrally mounted to a rear termianl edge of the floor plate, and the cassette holder further including a plurality of side wall flanges secured to the rear wall and the floor plate and spaced rearwardly of the pivot cylinder.

3. An apparatus as set forth in claim 2 including an arcuate pivot cylinder cradle defined between each pair of aligned cylinders to complementarily receive the pivot cylinder of each cassette holder therewithin.

4. An apparatus as set forth in claim 3 further including an abutment flange mounted integrally and orthogonally relative to the top edge of the forward vertical wall and extending outwardly therefrom, and each floor plate defining an abutment surface between the pivot cylinder and the ejector flange, wherein the abutment surface engages the flange in a first position, and the abutment surface is spaced from the flange in a second position when each cassette holder is positioned within the elongate cavity and the rear wall is in engagement with the second inclined wall.

* * * * *